(12) United States Patent
Buchner et al.

(10) Patent No.: US 10,766,482 B2
(45) Date of Patent: Sep. 8, 2020

(54) METHOD FOR STABILIZING A TRACTOR VEHICLE-TRAILER COMBINATION DURING TRAVEL

(71) Applicant: KNORR-BREMSE SYSTEME FUER NUTZFAHRZEUGE GMBH, Munich (DE)

(72) Inventors: Hermann Buchner, Alterhofen (DE); Florian Finkl, Munich (DE); Martin Mederer, Neumarkt (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 316 days.

(21) Appl. No.: 15/578,664

(22) PCT Filed: Jun. 2, 2016

(86) PCT No.: PCT/EP2016/000911
§ 371 (c)(1),
(2) Date: Nov. 30, 2017

(87) PCT Pub. No.: WO2016/192855
PCT Pub. Date: Dec. 8, 2016

(65) Prior Publication Data
US 2018/0154888 A1 Jun. 7, 2018

(30) Foreign Application Priority Data

Jun. 2, 2015 (DE) .......................... 10 2015 108 681

(51) Int. Cl.
*B60W 30/02* (2012.01)
*B60D 1/30* (2006.01)
(Continued)

(52) U.S. Cl.
CPC ............... *B60W 30/02* (2013.01); *B60D 1/30* (2013.01); *B60T 8/1708* (2013.01); *B60T 8/248* (2013.01);
(Continued)

(58) Field of Classification Search
CPC .. B60T 8/1708; B60T 8/1755; B60T 2230/06; B60T 7/20; B60T 8/323;
(Continued)

(56) References Cited

U.S. PATENT DOCUMENTS 3,894,773 A * 7/1975 Cleveland ............. B60T 8/1708
303/123
4,344,640 A * 8/1982 Ratsko ................... B62D 13/00
280/432

(Continued)

FOREIGN PATENT DOCUMENTS

DE 2547487 A1 * 4/1977 ............ B60T 8/1708
DE 3615071 A1 * 11/1987 ............ B62D 13/04
(Continued)

OTHER PUBLICATIONS

EPO machine translation of DE 102011117882 (original DE document published Oct. 25, 2012) (Year: 2012).*
(Continued)

*Primary Examiner* — Faris S Almatrahi
*Assistant Examiner* — David A Testardi
(74) *Attorney, Agent, or Firm* — Norton Rose Fulbright US LLP; Gerard Messina (57) ABSTRACT

A method and device for stabilizing a tractor vehicle-trailer combination during travel, in which tractor vehicle and trailer are connected via at least one pivot joint, including: ascertaining a setpoint buckling angle for a driving-stable setpoint movement of the combination, and/or a setpoint buckling angle velocity for a driving-stable setpoint move-
(Continued)

ment of the combination, between the combination or between two trailers; ascertaining an actual buckling angle for the effective actual movement of the combination, and/or an actual buckling angle velocity for the effective actual movement of the combination, between the tractor vehicle and trailer or between multiple trailers; ascertaining a deviation between the setpoint and actual buckling angles and/or between the setpoint and actual buckling angle velocities, and if the deviation exceeds a threshold value, generating a control signal to activate at least one vehicle component to control movement of the combination in a direction toward a driving-stable movement state.

22 Claims, 3 Drawing Sheets

(51) Int. Cl.
| | | |
|---|---|---|
| *B60T 8/17* | (2006.01) | |
| *B60T 8/24* | (2006.01) | |
| *B60T 8/32* | (2006.01) | |
| *B62D 53/08* | (2006.01) | |
| *B60W 10/06* | (2006.01) | |
| *B60W 10/184* | (2012.01) | |
| *B60W 40/10* | (2012.01) | |

(52) U.S. Cl.
CPC ............. *B60T 8/323* (2013.01); *B60W 10/06* (2013.01); *B60W 10/184* (2013.01); *B60W 40/10* (2013.01); *B62D 53/0871* (2013.01); *B60T 2230/06* (2013.01); *B60W 2510/20* (2013.01); *B60W 2520/10* (2013.01); *B60W 2520/125* (2013.01); *B60W 2520/14* (2013.01); *B60W 2520/22* (2013.01); *B60W 2520/28* (2013.01); *B60W 2710/0666* (2013.01); *B60W 2710/18* (2013.01); *B60W 2720/22* (2013.01)

(58) Field of Classification Search
CPC ........... B60T 8/248; B60D 1/30; B60D 1/305; B60W 30/02; B60W 2520/22; B62D 13/00; B62D 13/005; B62D 53/0871
See application file for complete search history.

(56) References Cited

U.S. PATENT DOCUMENTS

| | | | | | |
|---|---|---|---|---|---|
| 4,583,756 | A | * | 4/1986 | Hornung | B62D 53/0871 280/432 |
| 4,616,841 | A | * | 10/1986 | Reichl | B62D 53/0871 280/432 |
| 4,688,818 | A | * | 8/1987 | Grassmuck | B62D 53/0871 180/419 |
| 4,756,543 | A | * | 7/1988 | Cromnow | B62D 47/025 280/432 |
| 4,763,916 | A | * | 8/1988 | Ratsko | B62D 47/025 280/432 |
| 6,042,196 | A | * | 3/2000 | Nakamura | B60T 7/12 188/112 R |
| 6,450,019 | B1 | * | 9/2002 | Wetzel | B60T 8/1708 340/431 |
| 6,658,343 | B1 | * | 12/2003 | Koch | B60T 8/1755 701/71 |
| 2001/0007966 | A1 | * | 7/2001 | Sielagoski | B60K 31/0066 701/96 |
| 2001/0018630 | A1 | * | 8/2001 | Wetzel | B60T 8/1708 701/70 |
| 2001/0032043 | A1 | * | 10/2001 | Wetzel | B60T 8/1708 701/50 |
| 2001/0037164 | A1 | * | 11/2001 | Hecker | B62D 15/02 701/1 |
| 2002/0095251 | A1 | * | 7/2002 | Oh | B60T 7/20 701/70 |
| 2004/0080209 | A1 | * | 4/2004 | Leimbach | B60T 8/1708 303/146 |
| 2007/0252358 | A1 | * | 11/2007 | Cunefare | B62D 53/0878 280/432 |
| 2007/0282558 | A1 | * | 12/2007 | Sagisaka | B62D 5/049 702/116 |
| 2010/0066161 | A1 | * | 3/2010 | Fry | B60T 7/20 303/9.66 |
| 2011/0022282 | A1 | * | 1/2011 | Wu | B60D 1/245 701/70 |
| 2012/0200706 | A1 | * | 8/2012 | Greenwood | B60R 1/00 348/148 |
| 2013/0030665 | A1 | * | 1/2013 | Nishio | B60W 40/114 701/70 |
| 2015/0210254 | A1 | * | 7/2015 | Pieronek | B60W 10/18 701/70 |
| 2016/0075315 | A1 | * | 3/2016 | Luomaranta | B60T 8/1708 701/70 |
| 2016/0129896 | A1 | * | 5/2016 | Tu | B60T 8/248 701/70 |

FOREIGN PATENT DOCUMENTS

| | | | |
|---|---|---|---|
| DE | 19859953 A1 | 6/2000 | |
| DE | 19859966 A1 | 7/2000 | |
| DE | 19964164 A1 | 7/2001 | |
| DE | 10144299 A1 | 6/2003 | |
| DE | 102004022924 A1 | 11/2005 | |
| DE | 102007061836 A1 * | 6/2009 | ........... B60T 8/1708 |
| DE | 102007061836 A1 | 6/2009 | |
| DE | 102011117882 A1 * | 10/2012 | |
| DE | 102011117882 A1 | 10/2012 | |
| DE | 102013102796 A1 * | 9/2014 | |
| EP | 1081020 A2 * | 3/2001 | ........... B62D 13/04 |
| EP | 1283149 A2 | 2/2003 | |
| JP | 03002616 A * | 1/1991 | |
| JP | 04191430 A * | 7/1992 | |

OTHER PUBLICATIONS

International Search Report dated Sep. 12, 2016, of the corresponding International Application PCT/EP2016/000911 filed Jun. 2, 2016.

* cited by examiner

METHOD FOR STABILIZING A TRACTOR VEHICLE-TRAILER COMBINATION DURING TRAVEL

FIELD OF THE INVENTION

The present invention relates to a method for stabilizing a tractor vehicle-trailer combination during travel, in which a tractor vehicle and at least one trailer are connected to one another via at least one pivot joint, and also a device for stabilizing a tractor vehicle-trailer combination during travel, in which a tractor vehicle and at least one trailer are connected to one another via at least one pivot joint, and finally also a tractor vehicle-trailer combination, in which a tractor vehicle and at least one trailer are connected to one another via at least one pivot joint, which comprises such a device.

BACKGROUND INFORMATION

Tractor-trailer combinations made of a tractor vehicle and at least one trailer have significantly more degrees of freedom than a tractor vehicle alone and are therefore also significantly more susceptible with respect to driving-dynamics instabilities. The unstable driving states of tractor vehicle-trailer combinations include, for example, jackknifing, skidding, and also understeering or oversteering. The jackknifing of tractor vehicle-trailer combinations can be caused, for example, by a trailer sliding toward the tractor vehicle or, in the case of multiple trailers, by a further trailer sliding toward a trailer located ahead. The sliding in of the trailer can in turn be triggered by a tractor vehicle decelerating via the drivetrain. In the case of an agricultural tractor as the tractor vehicle, a deceleration can be caused by a continuously variable transmission (CVT).

SUMMARY OF THE INVENTION

The present invention is based on the object of providing a method and a device of the type mentioned at the outset, in which a high level of security against the occurrence of unstable driving states is ensured in tractor vehicle-trailer combinations.

This object may be achieved according to the invention by the features described herein.

Advantageous refinements of the invention are the subject matter of the further descriptions herein.

Hereafter, a tractor vehicle-trailer combination is to be understood as a tractor vehicle to which at least one trailer is coupled, so that tractor-trailer combinations having multiple trailers are also comprised thereby.

The method for stabilizing a tractor vehicle-trailer combination during travel, in which a tractor vehicle and at least one trailer are connected to one another via at least one pivot joint, comprises at least the following steps:

a) ascertaining a setpoint buckling angle, which characterizes a driving-stable setpoint movement of the tractor vehicle-trailer combination, and/or a setpoint buckling angle velocity, which characterizes a driving-stable setpoint movement of the tractor vehicle-trailer combination, between the tractor vehicle and the trailer or between multiple trailers, b) ascertaining an actual buckling angle, which characterizes the effective actual movement of the tractor vehicle-trailer combination, and/or an actual buckling angle velocity, which characterizes the effective actual movement of the tractor vehicle-trailer combination, between the tractor vehicle and the trailer or between two trailers, c) ascertaining a deviation between the setpoint buckling angle and the actual buckling angle and/or between the setpoint buckling angle velocity and the actual buckling angle velocity, and d) if the ascertained deviation exceeds a threshold value, generating a control signal to activate at least one vehicle component to control the movement of the tractor vehicle-trailer combination in the direction toward a driving-stable movement state.

The device for stabilizing a tractor vehicle-trailer combination during travel, in which a tractor vehicle and at least one trailer are connected to one another via at least one pivot joint, comprises at least the following:

a) a sensor unit, which modulates a first signal, which, alone or together with other variables, represents a setpoint buckling angle, which characterizes a driving-stable setpoint movement of the tractor vehicle-trailer combination, and/or a setpoint buckling angle velocity, which characterizes a driving-stable setpoint movement of the tractor vehicle-trailer combination, between tractor vehicle and trailer or between multiple trailers, and a second signal, which represents an actual buckling angle, which characterizes the effective actual movement of the tractor vehicle-trailer combination, and/or an actual buckling angle velocity, which characterizes the effective actual movement of the tractor vehicle-trailer combination, between tractor vehicle and trailer or between multiple trailers, c) an analysis electronics unit, which is configured, at least depending on the first signal and the second signal, c1) to ascertain the setpoint buckling angle and/or the setpoint buckling angle velocity, and c2) to ascertain the actual buckling angle and/or the actual buckling angle velocity, and c3) to ascertain a deviation between the setpoint buckling angle and the actual buckling angle and/or between the setpoint buckling angle velocity and the actual buckling angle velocity, and c4) to generate a control signal for activating at least one vehicle component for controlling the movement of the tractor vehicle-trailer combination in the direction toward a driving-stable movement state, if the ascertained deviation exceeds a threshold value.

It is therefore presumed that the setpoint buckling angle and/or the setpoint buckling angle velocity represents a driving-stable setpoint movement of the tractor vehicle-trailer combination. Therefore, if the deviation between the actual buckling angle and the setpoint buckling angle and/or between the setpoint buckling angle velocity and the actual buckling angle velocity exceeds a predefined or variable threshold value, it is thus presumed that an unstable driving state exists, which is corrected by an intervention, initiated by the control signal, of the at least one vehicle component to control the movement of the tractor vehicle-trailer combination in the direction toward a driving-stable movement state.

The invention is therefore based on a comparison between the actual buckling angle and the setpoint buckling angle and/or the chronological change of these two values. The deviation is ascertained or computed in this case in an analysis electronics unit. The analysis electronics unit is located in this case on the tractor vehicle or on the trailer or on one of the trailers.

The actual buckling angle is the angle which results between the longitudinal axis of the tractor vehicle and the longitudinal axis of the trailer or between the longitudinal axes of two adjacent trailers. The actual buckling angle is measured directly or indirectly by a buckling angle sensor, in particular by an optical, electrical, or mechanical buckling angle sensor. The actual or setpoint buckling angle velocity then represents the derivative of these values with respect to time.

Using the method according to the invention and/or using the device according to the invention, unstable driving states of tractor vehicle-trailer combinations, for example, in the form of excess jackknifing, skidding, and/or understeering or oversteering are therefore remedied and a more stable driving state is produced.

The goal of the method and/or the device is to recognize unstable driving states of tractor vehicle-trailer combinations and in the event of such a recognition to keep the vehicle tractor-trailer combination stable or stabilize it again by way of a driving-dynamics intervention. The tractor vehicle can be in this case, for example, a truck, a passenger automobile, or in particular an agricultural tractor.

All trailers which can be coupled to the above-mentioned tractor vehicles come into consideration as trailers in this case. A combination having multiple trailers, for example, in the case of agricultural tractor-trailer combinations, is also possible.

The device recognizes unstable vehicle states of the tractor vehicle-trailer combination on the basis of the buckling angle and/or the buckling angle velocity between the tractor-trailer combination vehicles (tractor vehicle-trailer vehicle or trailer vehicle-trailer vehicle). In this case, the actual buckling angle may be measured by at least one sensor and the setpoint buckling angle is additionally computed via various vehicle parameters. The alternatively or additionally used actual buckling angle velocity and/or setpoint buckling angle velocity then results by way of chronological derivation of these variables.

By way of a comparison of actual buckling angle to the setpoint buckling angle or of actual buckling angle velocity to the setpoint buckling angle velocity, the deviation thereof is recognized. If this deviation exceeds a threshold value, which can be parameterized, a driving-dynamics intervention is thus performed, for example, by closing at least one wheel brake of the tractor vehicle-trailer combination and/or by changing the engine torque of a drive engine of the tractor vehicle.

Advantageous refinements and improvements of the invention are possible by way of the measures set forth in the dependent claims.

Particularly, in task d) of the method claim or in the generating of the control signal in the device claim, respectively, the engine torque of a drive engine of the tractor vehicle is changed to control the movement of the tractor vehicle-trailer combination in the direction toward a driving-stable movement state. Depending on the embodiment and form of the instability, this can take place in the form of an increase or in the form of a reduction of the engine torque.

Alternatively or additionally thereto, in task d) of the method claim or in the generating of the control signal in the device claim, respectively, at least one wheel brake of the tractor vehicle and/or the at least one trailer is closed at all or with a higher degree of closing in relation to an already existing closing state, to generate a torque stabilizing the movement state. In other words, at least one wheel brake is transferred from its previously disengaged state into the closed state or a wheel brake which is already closed previously to a certain degree is closed to a higher degree, i.e., braked more strongly than before.

According to one refinement, the actual buckling angle is measured directly by a buckling angle sensor, in particular by an optical, electrical, or mechanical buckling angle sensor. The actual buckling angle velocity is then determined by the derivative of this value with respect to time.

In the case of tractor-trailer combinations made of agricultural tractor and semi-mounted trailer having steering axle(s), an electronic steering axle controller is widespread. In this case, the actual buckling angle is detected by a buckling angle sensor, for example, a potentiometer, and a steering angle of the trailer steering axle is set depending on the actual buckling angle and the trailer geometry. In this case, the signal of the buckling angle sensor provided in any case may be used for the method according to the invention or for the device according to the invention, respectively. Coupling points of the forced steering system (K50 ball at a distance of 250 mm and at the same height as the K80 ball) may be used in this case.

Alternatively thereto, however, the actual buckling angle can also be ascertained indirectly from output signals of at least one sensor deviating from a buckling angle sensor, in particular from output signals of at least two yaw rate sensors and/or acceleration sensors.

The ascertainment of the setpoint buckling angle, which characterizes the driving-stable setpoint movement of the tractor vehicle-trailer combination, may be performed by a predefined mathematical vehicle model, in which at least one variable characterizing the movement of the tractor vehicle and/or at least one variable characterizing the movement of the at least one trailer is/are incorporated as input variables.

In this case, the variable characterizing a movement of the tractor vehicle can be in particular at least one of the following variables: the steering angle of the tractor vehicle, the axle spacing of the tractor vehicle, the velocity of the tractor vehicle.

Alternatively or additionally, the variable characterizing a movement of the at least one trailer can comprise at least the curve radius R of the trailer, wherein the curve radius R is ascertained at least depending on the following variables:
a) depending on the wheel speeds of at least one left and at least one right wheel of the trailer and also depending on the velocity of the trailer, wherein in addition the lane width of the trailer is used in particular, and/or
b) depending on the lateral acceleration of the trailer and the velocity of the trailer, wherein the lateral acceleration of the trailer is detected, for example, by a lateral acceleration sensor arranged on the trailer, and/or
c) depending on the yaw rate of the trailer and the velocity of the trailer, wherein the yaw rate is ascertained, for example, by a yaw rate sensor arranged on the trailer.

Particularly, to compute the setpoint buckling angle, the variable characterizing a movement of the tractor vehicle and the variable characterizing a movement of the at least one trailer or the at least one variable characterizing the movement of at least one trailer can comprise at least the yaw rate of the tractor vehicle and the yaw rate of the at least one trailer or the yaw rate of one trailer and the yaw rate of a further trailer attached to the one trailer. The setpoint buckling angle is then determined in particular according to the method described in EP 1 347 906 B1, i.e., by two yaw rates of two successively arranged vehicles of the tractor vehicle-trailer combination (tractor vehicle-trailer or trailer-trailer).

The control signal may be generated immediately after the determination that the ascertained deviation has exceeded the predefined threshold value.

If a deviation is determined between setpoint and actual buckling angles, the intervention in the driving dynamics can be carried out immediately or, however, it can be checked, restricted, or checked for plausibility beforehand. Alternatively, the control signal may therefore be only generated when it has previously been determined that the tractor vehicle-trailer combination has exceeded a lower limiting velocity and/or executes forward travel. The driving-dynamics intervention for stabilizing the tractor vehicle-trailer combination can therefore only be carried out from a specific velocity and/or in the event of forward travel.

The threshold value is, for example, permanently predefined or variably set depending on driving conditions. The threshold value can in particular become smaller with rising travel velocity of the tractor vehicle-trailer combination and can become larger with sinking travel velocity of the tractor vehicle-trailer combination. It is therefore possible to make the (permitted) deviation, which can be parameterized, of setpoint and actual buckling angle and/or of setpoint and actual buckling angle velocity dependent on other variables. For example, the permissible deviation of setpoint and actual buckling angle and/or of setpoint and actual buckling angle velocity can be reduced with rising velocity and increased with sinking velocity.

The control signal for activating the at least one vehicle component, which controls the movement of the tractor vehicle-trailer combination in the direction toward a driving-stable movement state, may be generated depending on the distance of the deviation from the threshold value. In particular, the at least one vehicle component is activated by the control signal more toward a state which controls the movement of the tractor vehicle-trailer combination in the direction of a driving-stable movement state the greater the absolute value of the difference is between the deviation and the threshold value.

In other words, the degree of the driving-dynamics intervention, which is carried out here, for example, by braking at least one wheel of the tractor vehicle and/or at least one wheel of at least one trailer, can be carried out depending on the absolute value of the deviation of the actual buckling angle from the setpoint buckling angle and/or the actual buckling angle velocity from the setpoint buckling angle velocity. That is to say, the greater the deviation of the actual value from the setpoint value, the greater the driving-dynamics intervention which is initiated by the control signal. This means, for the case of a braking intervention, that the size of the braking torque or braking force generated by a braking actuator of the tractor vehicle-trailer combination also rises with increasing deviation of the actual value from the setpoint value. Vice versa, the driving-dynamics intervention sinks with smaller deviation of the actual value from the setpoint value.

According to one refinement of the device, the sensor unit contains a buckling angle sensor, which directly detects the actual buckling angle, and which generates the second signal, for example, a potentiometer.

The sensor unit can also contain a steering angle sensor of the tractor vehicle and at least one sensor for measuring the velocity of the tractor vehicle and/or the trailer, wherein the analysis electronics unit generates the first signal depending on these signals.

Alternatively or additionally, the sensor unit can contain at least one yaw rate sensor of the tractor vehicle and at least one yaw rate sensor of the trailer, wherein the analysis electronics unit generates the first signal on the basis of the signals of the mentioned sensors.

The invention also includes a tractor vehicle-trailer combination, in which a tractor vehicle and at least one trailer are connected to one another via at least one pivot joint, which comprises an above-described device. In this case, the analysis electronics unit can be arranged on the tractor vehicle or on a trailer. In particular, the analysis electronics unit is arranged on a trailer and is in particular integrated in a brake control device therein.

The analysis electronics control unit, in which the comparison of actual and setpoint buckling angle and/or the chronological derivative thereof is performed, can therefore be arranged on the tractor vehicle, or also on a trailer. In particular if the ascertainment of the setpoint buckling angle and/or the setpoint buckling angle velocity characterizing the driving-stable setpoint movement of the tractor vehicle-trailer combination is performed by a predefined mathematical vehicle model, in which at least one variable characterizing the movement of the at least one trailer is incorporated as an input variable, the analysis electronics unit is arranged on the trailer, because this at least one variable is available therein. In particular, a complete integration of the analysis electronics unit in the brake control device of the trailer brake system is then also possible. For the case in which the trailer is equipped with an electronic brake system (EBS), the ECU of the EBS brake control device can be used or the analysis software can be integrated completely in the EBS control unit. The EBS of the trailer is capable in any case of decelerating at least one trailer wheel by way of electrical signals, so that this functionality can then also be used in the scope of a driving-dynamics intervention for stabilizing the tractor vehicle-trailer combination.

In particular, no data or commands introduced from the tractor vehicle or from further trailers are required for this purpose. Each trailer therefore has an autonomous device for stabilizing the tractor vehicle-trailer combination.

The invention will be described in greater detail hereafter on the basis of exemplary embodiments with reference to the appended drawing.

DETAILED DESCRIPTION

Figure 1:
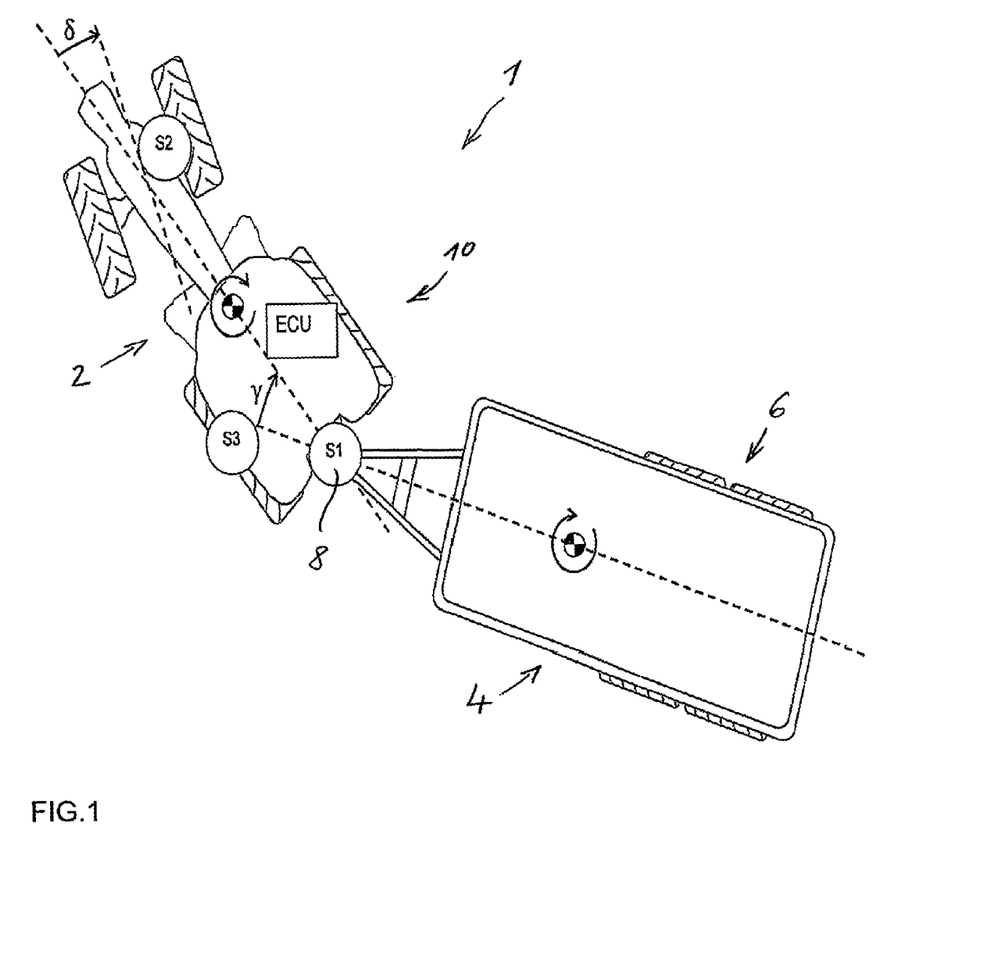
FIG. 1 shows a schematic top view of a tractor vehicle-trailer combination comprising an embodiment of a device for executing the method according to the invention.

The tractor vehicle-trailer combination shown in FIG. 1 consists here, by way of example, of an agricultural tractor 2 and a trailer 4 having rigid drawbar and one or two rear axles 6. Instead of only one trailer 4, multiple trailers could also be attached in succession to the tractor 2. The tractor 2 is connected via an articulated coupling having pivot joint to the trailer 4, wherein the pivot joint is only schematically indicated here by an axis of rotation or a coupling point 8.

The tractor-trailer combination 1 has a device 10 for stabilization during travel, which prevents and/or corrects unstable driving or movement states, for example, excess jackknifing, excess skidding, and/or excess oversteering and understeering.

For this purpose, the device 10 has a sensor unit S1, S2, S3, which modulates a first signal, which represents a setpoint buckling angle $\gamma_s$, which characterizes a driving-stable setpoint movement of the tractor vehicle-trailer combination 1 between tractor 2 and trailer 4, and a second signal, which represents an actual buckling angle $\gamma$, which characterizes the effective actual movement of the tractor-trailer combination 1 shown in FIG. 1 between tractor 2 and trailer 4.

Furthermore, the device 10 also has an analysis electronics unit ECU, which is configured, at least depending on the first signal, to ascertain the setpoint buckling angle $\gamma_s$ between the tractor 2 and the trailer 4. The analysis electronics unit ECU is arranged here, for example, on the tractor vehicle 2.

The sensor unit has here, for example, a sensor S1 for detecting the actual buckling angle $\gamma$ between the tractor 2 and the trailer 4, a sensor S2 for detecting the steering angle $\delta$ of the tractor 2, and a sensor S3 for detecting the velocity v of the tractor vehicle 4, for example, in the form of one or multiple wheel speed sensors on at least one wheel of the tractor vehicle 2. The buckling angle sensor S1 may be arranged at the coupling point 8 between tractor vehicle 2 and trailer 4 and consists, for example, of an electrical potentiometer.

The analysis electronics unit ECU computes, based on the steering angle $\delta$ of the tractor vehicle and the velocity v and from the geometric dimensions of the tractor vehicle and/or the trailer, the first signal representing the setpoint buckling angle $\gamma_s$ between the tractor 2 and the trailer 4. In addition, further variables from other vehicle control units or from a CAN-BUS of the tractor vehicle 2 can be input into the analysis electronics unit ECU to form the first signal and/or to compute the setpoint buckling angle $\gamma_s$. The use of the velocity v for the formation of the first signal and/or for the computation of the setpoint buckling angle $\gamma_s$ is optional.

Figure 3:
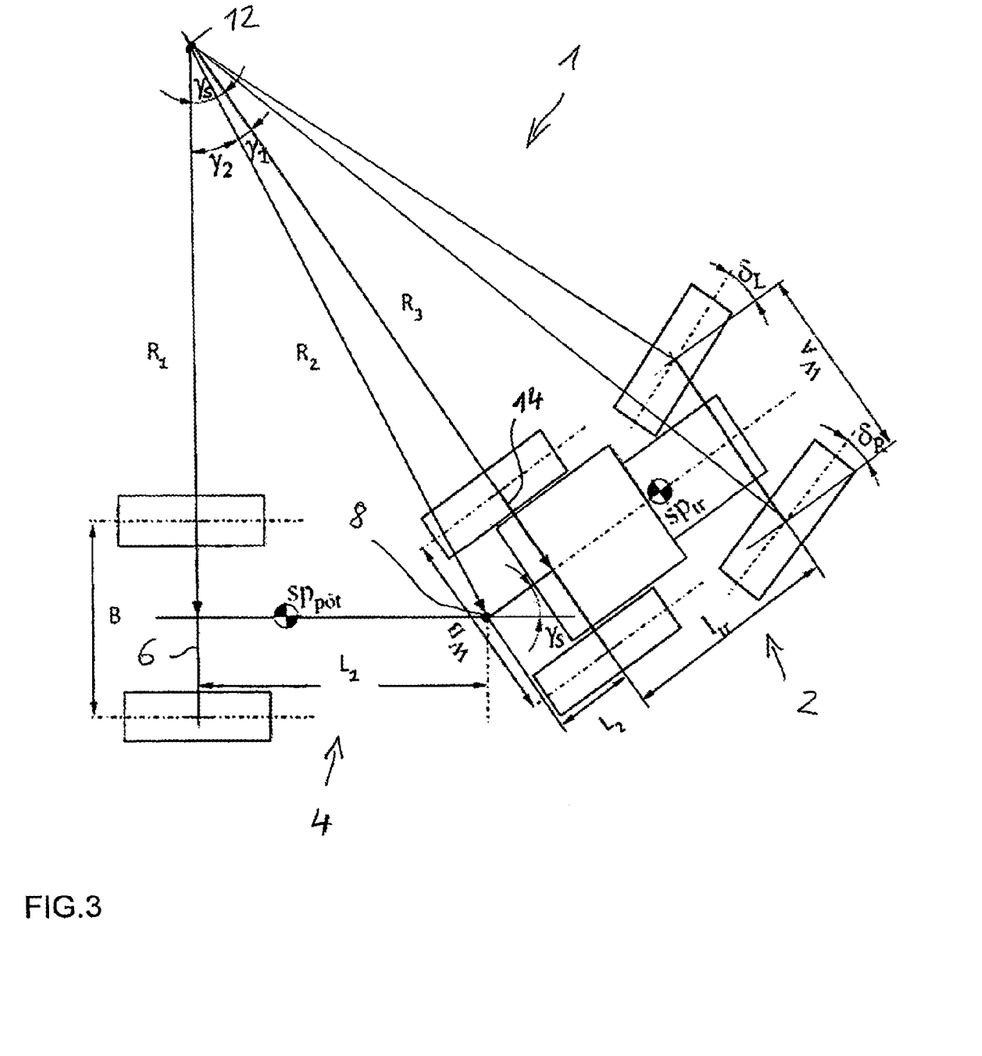
FIG. 3 shows a top view of the tractor vehicle-trailer combination of FIG. 1 with variables, on which an ascertainment of a setpoint buckling angle between the tractor vehicle and the trailer is based.

An alternative procedure for computing the setpoint buckling angle $\gamma_s$ is to compute it exclusively from geometric variables of the tractor vehicle or tractor 2 and the trailer 4, as illustrated by FIG. 3. Therein R1 is the radius between a pivot point 12 of the tractor-trailer combination 1 during cornering and a longitudinal center axis of the trailer 4, L1 is the longitudinal distance between the coupling point 8 between tractor 2 and trailer 4, on the one hand, and the rear axle of the trailer 4, on the other hand, R2 is the radius between the pivot point 12 of the tractor-trailer combination 1 and the coupling point 8 of tractor 2 and trailer 4, L2 is the longitudinal distance between the coupling point 8 between tractor 2 and trailer 4, on the one hand, and the rear axle 14 of the tractor vehicle 2, on the other hand, R3 is the radius between the pivot point 12 of the tractor-trailer combination 1 and a longitudinal center axis of the tractor 2, wherein this radius R3 is measured perpendicularly to the longitudinal center axis, B is the lane width of the rear axle of the trailer, ltr is the axle spacing of the tractor vehicle between front and rear axles.

The angle $\gamma_2$ and the radius R2 may be computed from the radius R1 and the length L1. The angle $\gamma_1$ may be determined from the radius R2 and the length L2. The length L2 varies minimally in the case of various tractor types. The influence is very slight because of the order of magnitude and the minor variation, however, and has almost no effect on the quality of the computed setpoint buckling angle $\gamma_s$. The setpoint buckling angle $\gamma_s$ then results from the total of the two buckling angles $\gamma_1$ and $\gamma_2$.

The analysis electronics unit ECU is furthermore configured so that it ascertains the actual buckling angle $\gamma$ between the tractor 2 and the trailer 4, which characterizes the effective actual movement of the tractor-trailer combination, on the basis of the second signal of the buckling angle sensor S2.

Figure 2:
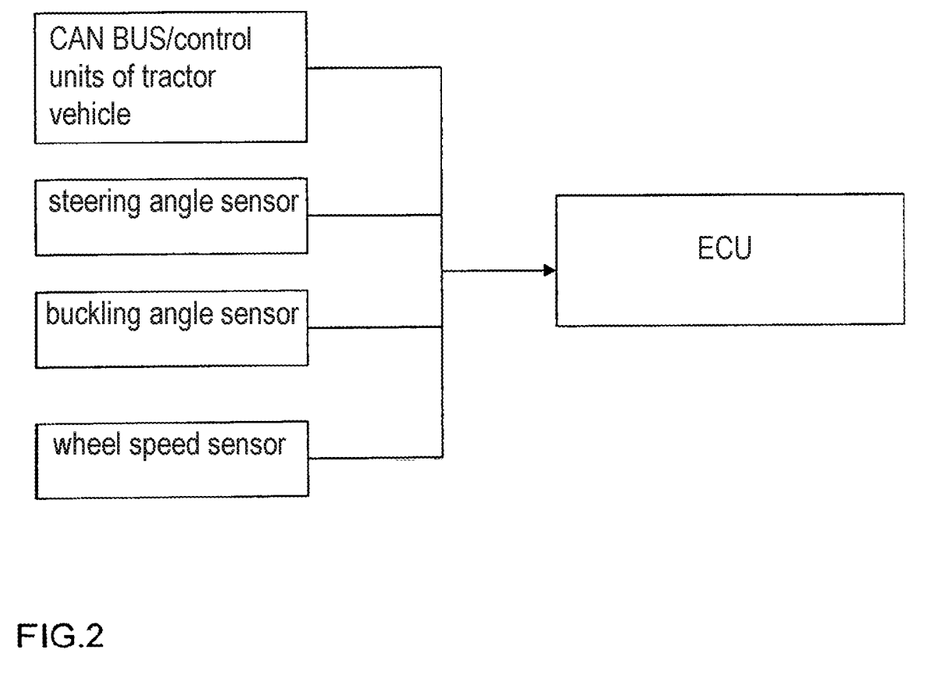
FIG. 2 shows a schematic illustration of the device from FIG. 1.

FIG. 2 schematically shows the signal flow between a CAN data bus of the tractor 2, on the one hand, which communicates with electronic control units of the tractor 2, for example, an engine control unit, and thus receives in particular data such as engine speed or engine torque, and the analysis electronics unit ECU, on the other hand. Furthermore, the analysis electronics unit ECU also receives the signals of the buckling angle sensor S1, the steering angle sensor S2, and the wheel speed sensor S3 and (also) forms the first signal and also the second signal therefrom as described above.

Furthermore, the analysis electronics unit ECU is configured so that it ascertains a deviation between the setpoint buckling angle $\gamma_s$ and the actual buckling angle $\gamma$ and generates a control signal for activating, for example, the wheel brakes of the trailer 4 and the drive engine of the tractor 2 for controlling the movement of the tractor-trailer combination 1 in the direction toward a driving-stable movement state, if the ascertained deviation exceeds a predefined or variable threshold value.

Therefore, if the deviation between the actual buckling angle $\gamma$ and the setpoint buckling angle $\gamma_s$ exceeds the permitted or tolerated threshold value, an unstable driving state of the tractor-trailer combination 1 is thus presumed, which is then remedied by a driving-dynamics intervention.

The List of reference numerals is as follows:
1 tractor vehicle-trailer combination
2 tractor
4 trailer
6 rear axle of trailer
8 coupling point
10 device
12 pivot point
14 rear axle of tractor vehicle

The invention claimed is:

1. A method for stabilizing a tractor vehicle-trailer combination during travel, in which a tractor vehicle and at least one trailer are connected to one another via at least one pivot joint, the method comprising:
   a) ascertaining, via an analysis electronics unit (ECU) and a sensor unit, a setpoint buckling angle, which characterizes a driving-stable setpoint movement of the tractor vehicle-trailer combination, and/or a setpoint buckling angle velocity, which characterizes a driving-stable setpoint movement of the tractor vehicle-trailer combination, between the tractor vehicle and the trailer or between two trailers;
   b) ascertaining, via the analysis electronics unit (ECU) and a sensor unit, an actual buckling angle, which characterizes the effective actual movement of the tractor vehicle-trailer combination, and/or an actual buckling angle velocity, which characterizes the effective actual movement of the tractor vehicle-trailer combination, between the tractor vehicle and the trailer or between multiple trailers;

c) ascertaining, via the analysis electronics unit (ECU) and a sensor unit, a deviation between the setpoint buckling angle and the actual buckling angle and/or between the setpoint buckling angle velocity and the actual buckling angle velocity, and
d) when the ascertained deviation exceeds a threshold value, generating, via the analysis electronics unit (ECU), a control signal to activate at least one vehicle component to control the movement of the tractor vehicle-trailer combination in the direction toward a driving-stable movement state;
wherein one of the following is satisfied: in task d), the engine torque of a drive engine of the tractor vehicle is changed, or in task d), at least one wheel brake of the tractor vehicle and/or the at least one trailer is closed or closed with a higher degree of closing in relation to an already existing closing state, to generate a torque which stabilizes the movement state,
wherein a variable characterizing a movement of the at least one trailer is used to ascertain the setpoint buckling angle, wherein the variable includes at least a curve radius of the trailer, wherein the curve radius is ascertained depending on a lateral acceleration of the trailer and the velocity of the trailer and at least one of the following variables: a) wheel speeds of at least one left and at least one right wheel of the trailer and a velocity of the trailer, and b) a yaw rate of the trailer and the velocity of the trailer, and
wherein the threshold value is variably set depending on driving conditions.

2. The method of claim 1, wherein in task d), the engine torque of the drive engine of the tractor vehicle is changed.

3. The method of claim 1, wherein in task d), the at least one wheel brake of the tractor vehicle and/or the at least one trailer is closed or closed with the higher degree of closing in relation to the already existing closing state, to generate the torque which stabilizes the movement state.

4. The method of claim 1, wherein the actual buckling angle is measured directly by a buckling angle sensor.

5. The method of claim 1, wherein the actual buckling angle is ascertained indirectly from output signals of at least one sensor deviating from a buckling angle sensor.

6. The method of claim 5, wherein the actual buckling angle is ascertained indirectly from output signals of at least two yaw rate sensors and/or acceleration sensors.

7. The method of claim 1, wherein the ascertainment of the setpoint buckling angle, which characterizes the driving-stable setpoint movement of the tractor vehicle-trailer combination, is performed by a predefined mathematical vehicle model, wherein at least one variable characterizing the movement of the tractor vehicle and/or at least one variable characterizing the movement of at least one trailer is incorporated as an input variable in the predefined mathematical vehicle model.

8. The method of claim 7, wherein the variable characterizing a movement of the tractor vehicle is at least one of the following variables: a steering angle of the tractor vehicle, an axle spacing of the tractor vehicle, and a velocity of the tractor vehicle.

9. The method of claim 7, wherein the variable characterizing a movement of the tractor vehicle and the variable characterizing a movement of the at least one trailer includes at least one of: (i) the yaw rate of the tractor vehicle and the yaw rate of the at least one trailer, or (ii) the yaw rate of one trailer and the yaw rate of a further trailer attached to the one trailer, wherein the at least one trailer includes the trailer and the further trailer.

10. The method of claim 1, wherein the control signal is generated after the determination that the ascertained deviation has exceeded the threshold value.

11. The method of claim 1, wherein the control signal is only generated when it has previously been determined that the tractor vehicle-trailer combination has exceeded a lower limiting velocity and/or executes forward travel.

12. The method of claim 1, wherein the threshold value becomes smaller with a rising velocity of the tractor vehicle-trailer combination and becomes larger with sinking velocity of the tractor vehicle-trailer combination.

13. The method of claim 1, wherein the control signal for activating the at least one vehicle component, which controls the movement of the tractor vehicle-trailer combination in the direction toward a driving-stable movement state, is generated depending on the distance of the deviation from the threshold value.

14. The method of claim 13, wherein the at least one vehicle component is activated by the control signal to a state which brings the movement of the tractor vehicle-trailer combination in the direction of a driving-stable movement state as a function of an increase in the absolute value of the difference between the deviation and the threshold value.

15. A device for stabilizing a tractor vehicle-trailer combination during travel, in which a tractor vehicle and at least one trailer are connected to one another via at least one pivot joint, comprising:
a sensor unit which modulates a first signal, which, alone or together with other variables, represents a setpoint buckling angle, which characterizes a driving-stable setpoint movement of the tractor vehicle-trailer combination, and/or a setpoint buckling angle velocity between the tractor vehicle and the trailer, which characterizes a driving-stable setpoint movement of the tractor vehicle-trailer combination, between the tractor vehicle and the trailer or between multiple ones of the trailers, and a second signal, which represents an actual buckling angle, which characterizes the effective actual movement of the tractor vehicle-trailer combination, and/or an actual buckling angle velocity, which characterizes the effective actual movement of the tractor vehicle-trailer combination, between the tractor vehicle and the trailer or between multiple ones of the trailers; and
an analysis electronics unit (ECU) configured, at least depending on the first signal and the second signal, to perform the following:
ascertain the setpoint buckling angle and/or the setpoint buckling angle velocity between the tractor vehicle and the trailer or between multiple ones of the trailers,
ascertain the actual buckling angle and/or the actual buckling angle velocity,
ascertain a deviation between the setpoint buckling angle and the actual buckling angle and/or between the setpoint buckling angle velocity and the actual buckling angle velocity, and
generate a control signal for activating at least one vehicle component to control the movement of the tractor vehicle-trailer combination in the direction toward a driving-stable movement state, when the ascertained deviation exceeds a threshold value;
wherein a variable characterizing a movement of the at least one trailer is used to ascertain the setpoint buckling angle, wherein the variable includes at least a curve radius of the trailer, wherein the curve radius is ascertained depending on a lateral acceleration of the trailer and the velocity of the trailer and at least one of the following variables: a) wheel speeds of at least one left and at least one right wheel of the trailer and a velocity of the trailer, and b) a yaw rate of the trailer and the velocity of the trailer, and wherein the threshold value is variably set depending on driving conditions.

16. The device of claim 15, wherein the sensor unit includes a buckling angle sensor, which directly detects the actual buckling angle, and which generates the second signal.

17. The device of claim 15, wherein the sensor unit includes a steering angle sensor of the tractor vehicle and at least one sensor for measuring the velocity of the tractor vehicle and/or the trailer, wherein the analysis electronics unit (ECU) generates the first signal depending on these signals.

18. The device of claim 15, wherein the sensor unit includes at least one yaw rate sensor of the tractor vehicle and at least one yaw rate sensor of the trailer, and wherein the analysis electronics unit (ECU) generates the first signal.

19. A tractor vehicle-trailer combination, comprising:
a tractor vehicle;
at least one trailer connected to the tractor trailer via at least one pivot joint; and
a device for stabilizing the tractor vehicle-trailer combination during travel, in which the tractor vehicle and the at least one trailer are connected to one another via the at least one pivot joint, including:
a sensor unit which modulates a first signal, which, alone or together with other variables, represents a setpoint buckling angle, which characterizes a driving-stable setpoint movement of the tractor vehicle-trailer combination, and/or a setpoint buckling angle velocity between the tractor vehicle and the trailer, which characterizes a driving-stable setpoint movement of the tractor vehicle-trailer combination, between the tractor vehicle and the trailer or between multiple ones of the trailers, and a second signal, which represents an actual buckling angle, which characterizes the effective actual movement of the tractor vehicle-trailer combination, and/or an actual buckling angle velocity, which characterizes the effective actual movement of the tractor vehicle-trailer combination, between the tractor vehicle and the trailer or between multiple ones of the trailers; and an analysis electronics unit (ECU) configured, at least depending on the first signal and the second signal, to perform the following:
ascertain the setpoint buckling angle and/or the setpoint buckling angle velocity between the tractor vehicle and the trailer or between multiple ones of the trailers,
ascertain the actual buckling angle and/or the actual buckling angle velocity,
ascertain a deviation between the setpoint buckling angle and the actual buckling angle and/or between the setpoint buckling angle velocity and the actual buckling angle velocity, and
generate a control signal for activating at least one vehicle component to control the movement of the tractor vehicle-trailer combination in the direction toward a driving-stable movement state, when the ascertained deviation exceeds a threshold value;
wherein a variable characterizing a movement of the at least one trailer is used to ascertain the setpoint buckling angle, wherein the variable includes at least a curve radius of the trailer, wherein the curve radius is ascertained depending on a lateral acceleration of the trailer and the velocity of the trailer and at least one of the following variables: a) wheel speeds of at least one left and at least one right wheel of the trailer and a velocity of the trailer, and b) a yaw rate of the trailer and the velocity of the trailer, and
wherein the threshold value is variably set depending on driving conditions.

20. The tractor vehicle-trailer combination of claim 19, wherein the analysis electronics unit is arranged on the tractor vehicle or on the at least one trailer.

21. The tractor vehicle-trailer combination of claim 20, wherein the analysis electronics unit (ECU) is arranged on the at least one trailer.

22. The tractor vehicle-trailer combination of claim 21, wherein the analysis electronics unit (ECU) is integrated in a brake control device of the at least one trailer.

* * * * *